May 14, 1957  S. VERNET  2,792,179
THERMOSTATICALLY ACTUATED VALVE
Filed July 31, 1953  3 Sheets-Sheet 1

INVENTOR.
SERGIUS VERNET.
BY
ATTORNEYS.

May 14, 1957 — S. VERNET — 2,792,179
THERMOSTATICALLY ACTUATED VALVE
Filed July 31, 1953 — 3 Sheets-Sheet 2
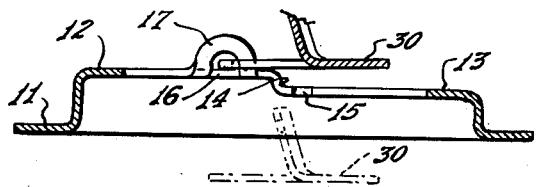
FIG. 8.
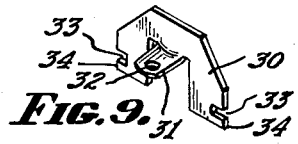
FIG. 9.
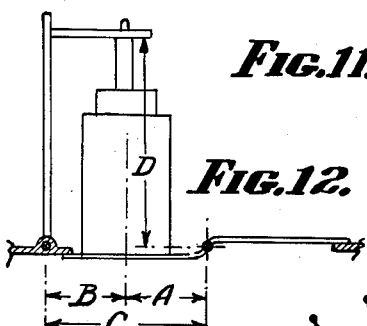
FIG. 11.
FIG. 12.
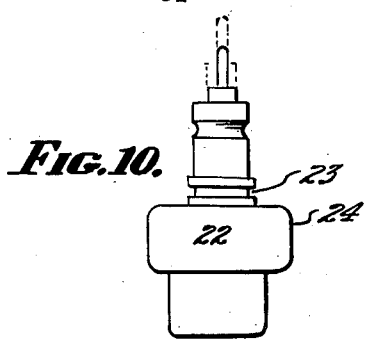
FIG. 10.
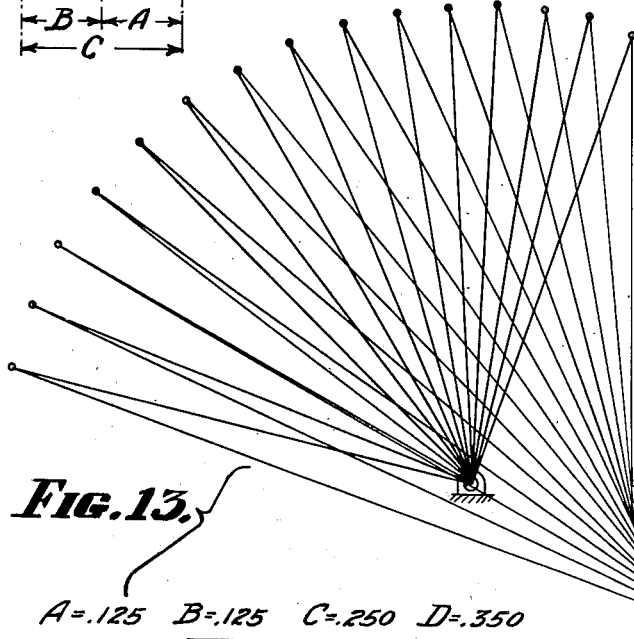
FIG. 13.
A=.125  B=.125  C=.250  D=.350
| VALVE OPENING | 5° | 10° | 15° | 20° | 25° | 30° | 35° | 40° | 45° | 50° | 55° | 60° | 65° | 70° |
|---|---|---|---|---|---|---|---|---|---|---|---|---|---|---|
| PISTON MOVEMENT | .025 | .022 | .022 | .022 | .022 | .023 | .023 | .019 | .019 | .016 | .015 | .012 | .010 | .006 |
| TOTAL PISTON TRAVEL | .025 | .047 | .069 | .091 | .113 | .136 | .159 | .178 | .197 | .213 | .228 | .240 | .250 | .256 |
INVENTOR.
SERGIUS VERNET,
BY
ATTORNEYS.

$A=.042$  $B=.208$  $C=.250$  $D=.350$

| Valve Opening | 5° | 10° | 15° | 20° | 25° | 30° | 35° | 40° | 45° | 50° | 55° | 60° | 65° | 70° |
|---|---|---|---|---|---|---|---|---|---|---|---|---|---|---|
| Piston Movement | .023 | .024 | .025 | .023 | .026 | .023 | .025 | .022 | .021 | .021 | .020 | .016 | .012 | .013 |
| Total Piston Travel | .023 | .047 | .072 | .095 | .121 | .144 | .169 | .191 | .212 | .233 | .263 | .269 | .281 | .294 |

INVENTOR.
SERGIUS VERNET,
BY
ATTORNEYS.

United States Patent Office 2,792,179
Patented May 14, 1957

2,792,179

THERMOSTATICALLY ACTUATED VALVE

Sergius Vernet, Yellow Springs, Ohio

Application July 31, 1953, Serial No. 371,642

10 Claims. (Cl. 236—34)

This invention relates to a thermostatically actuated valve and more particularly to a valve suitable for use in the cooling system of automobile engines. The thermostatic element itself as disclosed herein is of the type wherein a piston is moved by pressure exerted by the expansion of special thermostatic material highly sensitive to temperature variations. Such thermostatic units are available on the market under the name Vernatherm. It is a characteristic of this type of thermostat that the piston movement can be utilized directly to perform work, thus eliminating the use of servomechanisms, relays and the like. Since the thermostatic element does not form a part of the present invention, it will not be described further herein.

Automobile engine cooling system valves have been produced heretofore using thermostats of the type above outlined but the mounting of such thermostats has been complex requiring the use of special tools in its assembly.

It is an object of the present invention to provide a thermostatically actuated valve utilizing a piston type thermostatic unit wherein the mounting is greatly simplified and wherein the valve can be assembled manually without the use of tools or fixtures of any kind.

It is another object of the invention to provide a mounting which is extremely simple and fool-proof. Still another object involves the provision of a mounting wherein cocking of a piston of the thermostat is minimized or substantially avoided.

These and various other objects of the invention which will be described in greater detail hereinafter or which will be apparent to one skilled in the art upon reading these specifications, I accomplish by that certain construction and arrangement of parts of which I shall now describe certain exemplary embodiments.

Reference is made to the drawings forming a part hereof, and in which:

Figure 8 is a cross sectional view similar to Figures 2, 3 and 4 showing how the yoke member is assembled or disassembled from the device.

Figure 9 is a perspective view of the yoke element.

Figure 10 is an elevational view of the thermostat unit.

Figure 11 is a perspective view of a washer for holding the thermostat unit in assembly on the valve.

Figure 12 is a diagrammatic representation of the valve yoke and thermostat unit useful in connection with an understanding of the showings of Figures 13 and 14.

Figure 13 is a diagram and table showing the piston movement and total piston travel and various degrees of valve opening when the parts bear a certain relationship to each other.

Figure 1:
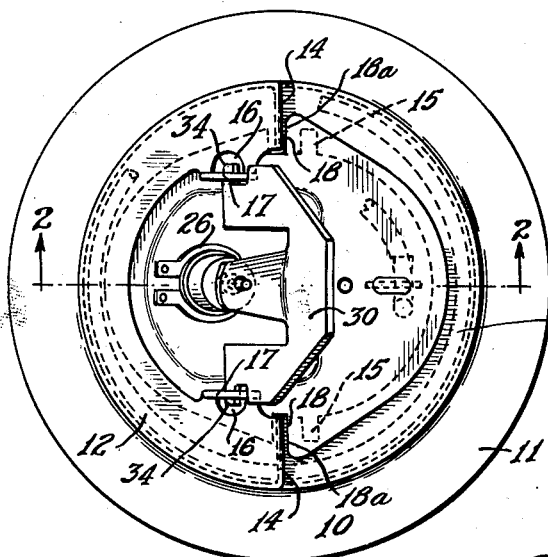
Figure 1 is a plan view of a thermostatically actuated valve according to the invention.

Briefly, in the practice of my invention, I provide a ring-like member having an aperture therein and providing a valve seat. Arranged to cooperate with the valve seat is a valve member which is a plate having a portion arranged to seat on the underside of the valve opening around one-half of its circumference and to seat on top thereof over the other half of its circumference. The valve may thus be said to be of the half over, half under type.

The valve plate has secured to it a thermostatic element of the piston type, the piston of which engages a lug on a yoke which is pivoted to the ring member for pivotal movement parallel to the valve pivot. A spring is provided to hold the valve normally closed and to hold the parts in assembly.

Referring now in greater detail to the drawings, the device comprises a member indicated generally at 10 which may comprise an annular flange 11 and a raised valve seat portion having two levels. The under surface of the portion 12, which occupies approximately one-half of the periphery of the valve seat, is raised above the upper surface of the portion 13 which occupies the other half of the periphery by an amount substantially equal to the thickness of the valve plate. The portions 12 and 13 are thus demarked by the diametral shoulders 14 and it will be understood that the underside of the portion 12 and the upper side of the portion 13 constitute the valve seat proper.

Figures 5, 6:
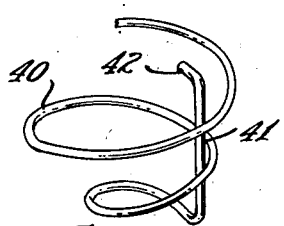
Figure 5 is a perspective view of the spring for maintaining the valve in closed position.
Figure 6 is a fragmentary view of the ring or valve seat element.

As best seen in Figure 6, the portion 13 is provided with the slots 15 adjacent the shoulders 14 and the portions 12 are provided with inwardly extending lugs having the elongated slots 16, the lugs being bent up to form the upstanding eyes 17 for a purpose to be described hereinafter.

Figure 7:
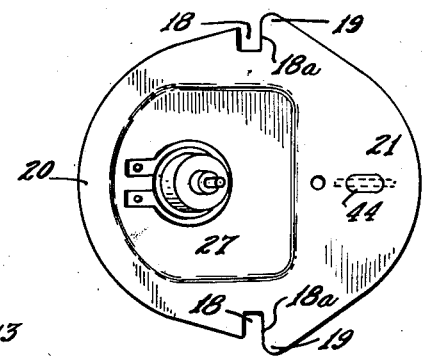
Figure 7 is a plan view of the valve element in disassembled condition but with the thermostat unit in place.

The valve plate member, as best seen in Figure 7, is provided with the diametrically opposed slots 18 which engage the shoulders 14 and the edges 18a, which constitute the pivot axis of the valve in cooperation with the shoulders 14. The edges 18a of the slots 18 terminate in the noses 19 which extend beyond the general periphery of the valve plate member.

From what has been said above, it will be clear that the valve plate is assembled to the ring member by turning it up on edge and passing the left side downwardly through the slots 15 of the ring until the edges 18a abut the member 13. The extended noses 19 prevent further movement through the slots 15. The valve plate is then moved slightly toward the left so that the slots 18 lie behind the shoulder 14, as clearly seen in Figure 1. In this position then the left-hand portion of the valve plate indicated generally at 20 lies under the portion 12 while the right-hand portion of the valve plate, indicated generally at 21, lies on top of the portion 13. In opening, the valve plate simply pivots in a counterclockwise direction on the edges 18a bearing against the angle formed by the portion 13 and shoulders 14.

The valve plate itself has secured to it the thermostatic element which is indicated generally at 22. This element has an annular groove 23 spaced from the end of the cup 24 by the thickness of the metal of the valve plate. The valve plate has a hole 25 and the reduced cylinder portion of the member 22 is passed through the hole 25 and the unit is then held in place by means of a washer 26, shown in detail in Figure 11. This washer may be of soft spring-like material which can be spread to pass around the neck in the groove 23 and it may then spring back together to hold the member 22 in position on the valve plate. I have found it desirable to deform the material of the valve plate in the area where the thermostat unit is mounted and indicated generally at 27, in order to dispose the thermostat unit with its axis at an angle to the plane of the valve plate. The reasons for this will appear more fully hereinafter.

In order for the movement of the piston to be operative to cause opening of the valve, means must be provided for the piston to exert thrust against, and such means comprise a yoke 30, shown in detail in Figure 9, comprising a lug 31 having a hole 32 for the end of the piston and having the slots 33 defining pintles 34. The pintles 34 have their bearing in the upstanding eyes 17 and the yoke is assembled to the eyes by bringing the pintles up into the eyes through the slots 16, as will be readily apparent from a consideration of Figure 1. The yoke 30 is thus arranged to pivot on its pintles 34 about an axis parallel to the pivot axis of the valve plate but spaced therefrom.

Figure 2:
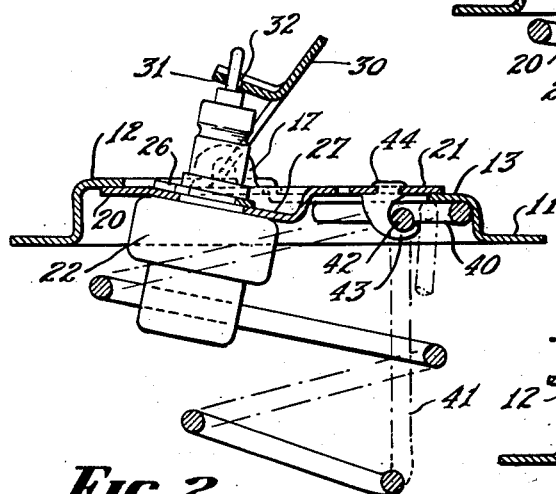
Figure 2 is a cross sectional view of the same taken on the line 2—2 of Figure 1 showing the valve in closed position.
Figure 4:
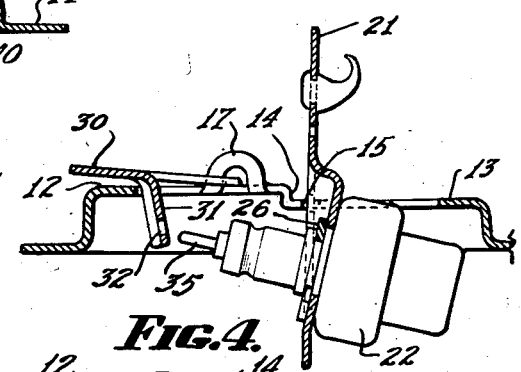
Figure 4 is a view similar to Figures 2 and 3 showing a step in the assembly or disassembly of the valve.

Assuming the valve plate to have been inserted as heretofore described and the yoke assembled as just now described, it can be seen from Figure 4 that the parts can manually be assembled to the point where the reduced end 35 of the piston can be introduced into the hole 32 of the lug 31. The parts are then rotated to the position shown in Figure 1 and are finally held in position by insertion of the spring member 40, shown in detail in Figure 5. This spring member has a spiral portion terminating in an inturned straight portion 41 which terminates in a hook element 42. The spring member 40 is placed on the underside of the portion 13, as shown in Figure 2, and the hook element 42 is engaged under a hook member 43 which is secured to the underside of the portion 21 as indicated at 44. With the spring in place, all the components of the valve, including the valve plate, the thermostat unit, the yoke and the spring, are held together.

Figure 3:
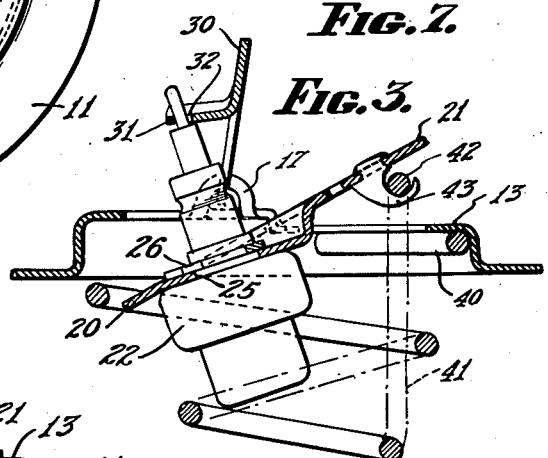
Figure 3 is a view similar to Figure 2 but showing the valve in partially open position.

It will now be clear that as the cup 22 of the thermostat unit is subjected to increasing temperatures, the piston thereof will move upwardly as seen in Figures 2 and 3. As it moves upwardly, it bears against the lug 31 of the yoke 30 so that the valve plate is caused to rock in a counterclockwise direction about its pivot. The valve is shown in partially open position in Figure 3. As the temperature is reduced, the spring moves the valve plate back toward the position of Figure 2 as permitted by the shrinkage of the thermostatic material which permits the piston to be pushed back.

In Figures 1 to 11 inclusive, I have shown the axis of the piston of the thermostat as being substantially on the pivot axis of the yoke 30 although it is slightly beyond that axis with respect to the pivot axis of the valve plate. From a comparison of Figures 2 and 3, it will be noted that the axis of the piston remains very close to the pivot axis of the yoke whereby cocking of the piston is maintained at a minimum. It should be noted that the performance of the valve can be varied considerably by choice of the relationship between the pivot axis of the valve member, the pivot axis of the yoke and the axis of the piston. Thus, in Figures 13 and 14 I have shown the effect of two specific different locations of the parts. In the diagram of Figure 12, the distance C represents the distance between the pivot axis of the valve and the yoke. A represents the distance between the axis of the piston and the pivot axis of the valve, while B represents the distance between the axis of the piston and the pivot axis of the yoke. D represents the maximum piston travel. From the table at the bottom of Figure 13, it will be observed that for 5° increments in valve opening, the piston movement remains fairly constant between .022″ and .025″ until the valve has achieved a 35° opening. Thereafter the amount of piston movement to produce a 5° further valve opening drops off until at 65° piston movement of .006″ produces a 5° increment in valve opening.

Figure 14:
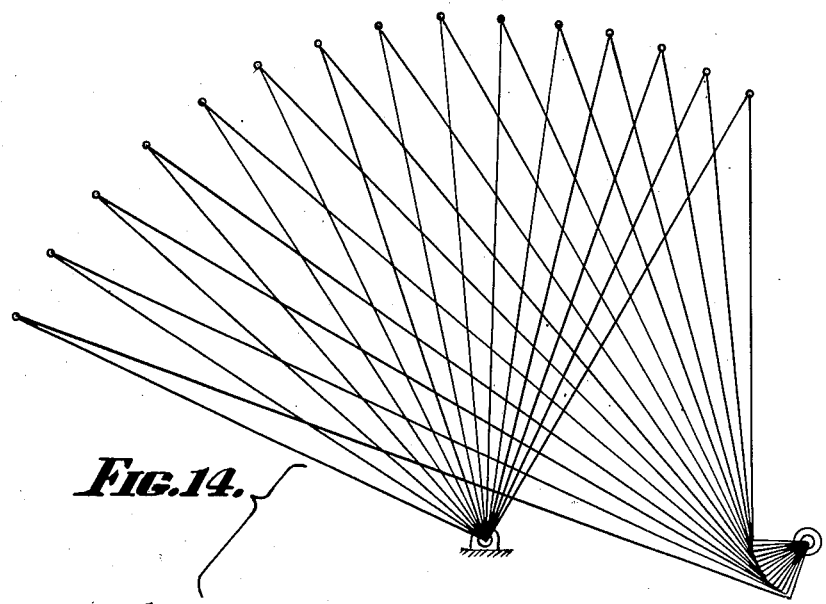
Figure 14 is a diagram and table similar to Figure 13 showing the operation with a different relationship between the parts.

The results for a different set of values are shown in Figure 14 and here the amount of piston movement, per 5° valve opening increments, remains fairly constant up to about 55° and at a valve opening of 65°, a movement of .013″ of the piston produces an additional 5° of valve opening.

With the teachings herein contained, it will be clear how thermostatically controlled valves, having almost any desired characteristics, can be achieved.

It is a simple matter to adjust the device accurately by simply bending the lug 31 until the desired results are achieved. It will be understood that in the showings of Figures 2 and 3 the flow of water through the valve is upwardly so that the thermostat cup 22 is exposed to the hot water.

It will be clear that numerous variations may be made without departing from the spirit of my invention and I therefore do not intend to limit myself except as set forth in the claims which follow.

Having now fully described my invention, what I claim as new and desire to secure by Letters Patent is:

1. A thermostatically actuated valve unit comprising a ring element having an aperture therein, a valve plate pivotally mounted in said ring element substantially on a diameter thereof and capable of movement from a closed position in which said plate effectively closes said aperture to a position in which said aperture is substantially unrestricted, a piston type thermostat securely mounted in said plate, a yoke having aligned pintles pivotally mounted in aligned trunnions on opposite sides of said ring, the axis of said pintles being parallel to the pivot axis of said valve plate but spaced from said last named pivot axis, said yoke bridging said aperture and having an element intermediate said pintles engaging the piston of said thermostat, and spring means to hold said valve plate normally in closed position, one end of said spring element bearing against said ring, and the other end passing through said aperture and hookingly engaging said plate, whereby upon movement of said piston, said valve plate is moved against the action of said spring means, said pivoted yoke carrying the thrust of said piston, and whereby said spring means serves to hold the parts in assembled relation.

2. A device according to claim 1, wherein the axis of said piston in the closed position of the valve is between the pivot axis of said plate and yoke.

3. A device according to claim 2 wherein the axis of said piston is closely adjacent the pivot axis of said yoke.

4. A device according to claim 1, wherein the axis of said piston in the closed position of the valve is beyond the pivot axis of said yoke with respect to the pivot axis of said plate.

5. A device according to claim 4, wherein the axis of said piston is closely adjacent the pivot axis of said yoke.

6. A device according to claim 1, wherein said ring is provided with a pair of upstanding eyes constituting said trunnions and said yoke is formed with a pair of pintles engaging said eyes to constitute the pivotal mounting of said yoke.

7. A device according to claim 1, wherein said ring is provided with opposed slotted lugs extending toward each other into said aperture, said lugs being bent up at right angles intermediate the length of said slots, and said yoke being formed with opposed pintles having their bearing in the slots in the up-turned portions of said lugs and capable of assembly and disassembly from beneath said lugs with the pintles passing freely through that portion of the slots lying in the flat portions of said lugs.

8. A device according to claim 1, wherein said ring is divided diametrally into two half portions in different parallel planes connected by diametrically disposed shoulders, the lower of said planes having opposed slots spaced from said shoulders, said valve plate having diametrically opposed slots for mounting on said ring, one edge of each of said last named slots being elongated so that said plate may be inserted edgewise into the slots in said ring up to said elongated edges, and so that said plate may then be moved laterally against said shoulders to have a pivotal mounting thereagainst, said plate in closed position lying one half under and one half over said ring.

9. A device according to claim 8, wherein said plate, on the underside of its portion which lies over said ring, is provided with a hook member, and wherein said plate is held in assembly with said ring by means of a spiral spring element bearing on the underside of said ring and having a portion terminating in a finger arranged to engage said hook member.

10. In a thermostatically actuated valve unit, a ring member constituting a mounting element, said ring member having half its circumference in one plane and the other half in a parallel plane, a valve plate having diametrically opposed notches, pivotal thereon and in closed position half underlapping and half overlapping said ring member, a piston-type thermostat secured to said valve plate on the under side of the underlapping half with the piston extending through said plate, a yoke pivotable on said ring member and in engagement with the piston of said thermostat, and a spring member bearing against said ring member on the thermostat side and engaged with said plate on the overlapping half to hold said plate normally closed, said spring member serving to hold said ring member, plate and yoke in assembly.

References Cited in the file of this patent
UNITED STATES PATENTS

| | | |
|---|---|---|
| 1,607,745 | Palm | Nov. 23, 1926 |
| 2,072,500 | Gaul | Mar. 2, 1937 |
| 2,102,201 | Durant | Dec. 14, 1937 |
| 2,569,359 | Vellinga | Sept. 25, 1951 |